(12) United States Patent
Seevers et al.

(10) Patent No.: US 7,931,768 B2
(45) Date of Patent: Apr. 26, 2011

(54) METHOD AND DEVICE FOR CONSTRUCTING A RADIAL TIRE

(75) Inventors: Joern Seevers, Burgdorf (DE); Claudia Thomfohrde, Leiferde (DE); Jens Winkler, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 950 days.

(21) Appl. No.: 11/720,715

(22) PCT Filed: Nov. 9, 2005

(86) PCT No.: PCT/EP2005/011958
§ 371 (c)(1),
(2), (4) Date: Jun. 1, 2007

(87) PCT Pub. No.: WO2006/058599
PCT Pub. Date: Jun. 8, 2006

(65) Prior Publication Data
US 2009/0272484 A1  Nov. 5, 2009

(30) Foreign Application Priority Data
Dec. 4, 2004  (DE) .................. 10 2004 058 522

(51) Int. Cl.
*B29D 30/26* (2006.01)
(52) U.S. Cl. ...... 156/117; 156/126; 156/130; 156/406.2
(58) Field of Classification Search ........... 156/126, 156/127, 130, 117, 397, 130.3, 111, 396, 156/400–402, 406.2, 415–420; 152/531, 152/533
See application file for complete search history.

(56) References Cited

U.S. PATENT DOCUMENTS

| | | | |
|---|---|---|---|
| 3,152,031 A | | 10/1964 | Nebout |
| 3,674,604 A | | 7/1972 | Gazuit |
| 3,687,757 A | * | 8/1972 | Menell .......................... 156/126 |
| 3,740,293 A | | 6/1973 | Jones et al. |
| 3,833,445 A | | 9/1974 | Mallory et al. |
| 3,867,230 A | * | 2/1975 | Van Horn et al. ............. 156/417 |
| 4,039,366 A | * | 8/1977 | Yabe .......................... 156/406.2 |
| 4,288,265 A | | 9/1981 | Pacciarini et al. |
| 4,775,433 A | * | 10/1988 | Ishii .............................. 156/117 |
| 4,869,307 A | * | 9/1989 | Bormann et al. ............. 152/533 |
| 4,909,878 A | * | 3/1990 | Watanabe ..................... 156/162 |
| 5,209,797 A | | 5/1993 | Giancola et al. |

(Continued)

FOREIGN PATENT DOCUMENTS
EP  0468738  1/1992

(Continued)

*Primary Examiner* — Geoffrey L Knable
(74) *Attorney, Agent, or Firm* — Greenblum & Bernstein, P.L.C.

(57) ABSTRACT

Device and method for building a radial tire. The device includes a first drum device for building a belt package and a transfer device for transferring the belt package from the first drum device to a second drum device having arranged thereon a carcass tube from at least one airtight inner layer, a carcass play and two bead cores with core profiles. The second drum device is arranged between core clamping devices and is structured and arranged to join the carcass tube and the belt package during expansion of the second drum device. The belt package is contoured or shaped by deformation via the second drum device. This abstract is not intended to define the invention disclosed in the specification, nor intended to limit the scope of the invention in any way.

11 Claims, 4 Drawing Sheets

U.S. PATENT DOCUMENTS

| | | |
|---|---|---|
| 5,248,357 A | 9/1993 | Miyanaga et al. |
| 5,616,209 A | 4/1997 | Laurent et al. |
| 6,234,227 B1 | 5/2001 | Bosseaux |
| 6,475,319 B1 * | 11/2002 | Akiyama .................. 156/111 |
| 2004/0177914 A1 | 9/2004 | Girard et al. |
| 2004/0261934 A1 * | 12/2004 | Nakata et al. ............... 156/126 |
| 2006/0130959 A1 * | 6/2006 | Lacagnina ................ 156/130 |

FOREIGN PATENT DOCUMENTS

| | | |
|---|---|---|
| EP | 0433974 | 1/1996 |
| EP | 1457309 | 3/2007 |
| GB | 997253 | 7/1965 |
| GB | 1181073 | 2/1970 |
| GB | 1383532 | 2/1975 |
| GB | 1407115 | 9/1975 |

* cited by examiner

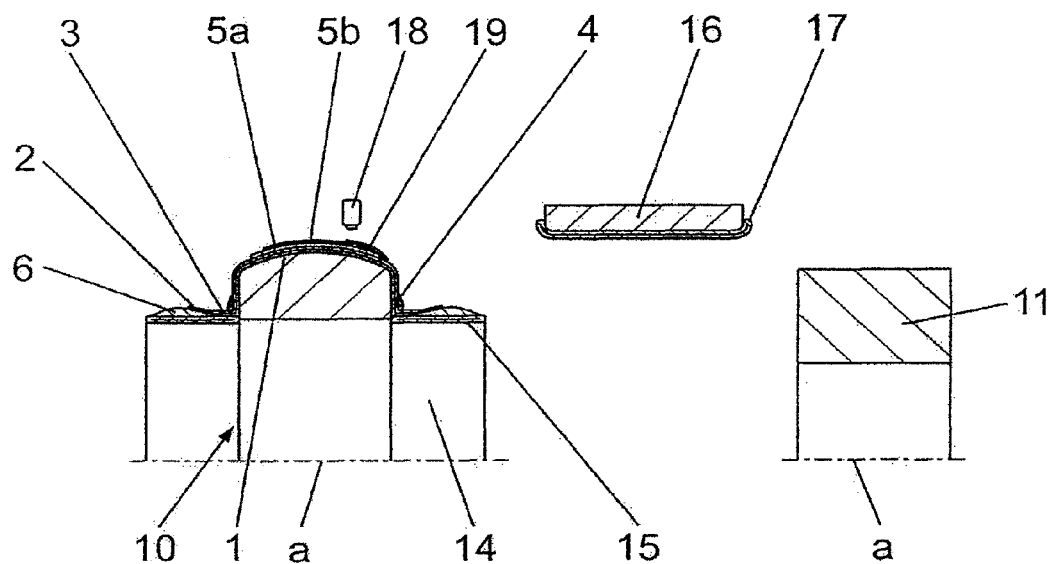
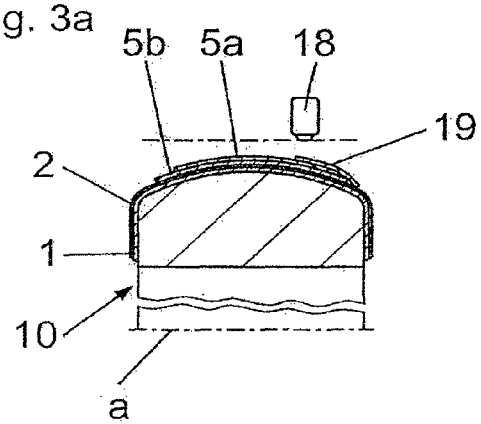
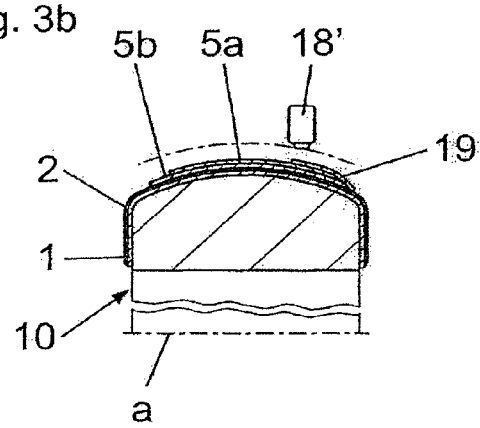
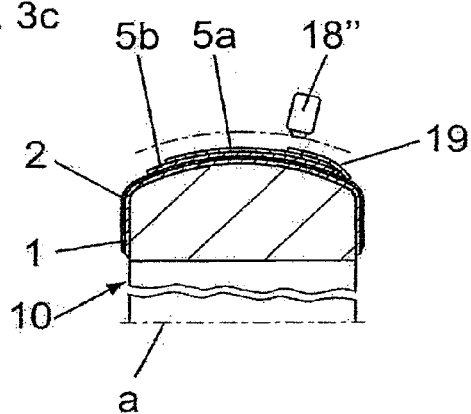

METHOD AND DEVICE FOR CONSTRUCTING A RADIAL TIRE

CROSS-REFERENCE TO RELATED APPLICATIONS

The present application is a U.S. National Stage of International Patent Application No. PCT/EP2005/011958 filed Nov. 9, 2005 which published as WO 2006/058599 on Jun. 8, 2006, and claims priority of German Patent Application No. 10 2004 058 522.9 filed Dec. 4, 2004.

BACKGROUND OF THE INVENTION

1. Field of the Invention

The invention relates to a method for building a radial tire utilizing the following steps: Building a belt package of at least two, in particular, automatically spliced belt plies on a segmented belt build-up drum having a cylindrical outside circumference; Building a carcass tube having an airtight inner layer, at least one carcass ply and two bead cores with core profiles on a separate building drum; Transferring the carcass tube to a further segmented building drum to which bellows supports moveable in the axial direction or core clamping devices with inflatable bellows or deflector devices are connected laterally; and Transferring the belt package to the further building drum and positioning the same over the carcass tube.

The invention further relates to a device for building a radial tire with the following features: A segmented belt build-up drum having a cylindrical outside circumference; A separate building drum for building a carcass tube from at least one airtight inner layer, a carcass ply and two bead cores with core profiles; A transfer device for transferring the belt package from the belt build-up drum to a further segmented building drum; On which the carcass tube and the finished belt package can be joined; Whereby axially moveable bellows supports or core clamping devices are arranged at the side of the further building drum.

2. Discussion of Background Information

In the conventional manufacture of radial tires for automobiles, the contouring of the steel belt comprising at least two belt plies generally does not occur until the vulcanization of the tire by the molding of the green-cover built on cylindrical building drums by means of a bellows inflated in the interior of the green-cover inserted into the tire mold. The belt and the tread are thereby given their final contour, whereby the elevation or extension of the belt is larger in the zenith of the tire than in the shoulder areas. A non-uniform expansion of the material in the tire, in particular, the strength supports in the belt plies and the winding bandage, occurs in this manner across the cross section of the tire. This non-uniform expansion results in a material displacement of the belt plies relative to the components surrounding them, in particular, a change in the angle of the strength supports in the belt plies over the cross section of the tire and an inward contraction of the belt edges radially inside the bandage applied to the belt and an unequal distribution of tension of the strength supports located above the belt.

Furthermore, methods and devices are known for building a green-cover on a segmented stable core, the external surface of which corresponds at least essentially to the inner surface of the tire to be formed. In this context, reference is made, e.g., to U.S. Pat. No. 5,616,209. Most of the components of the tire are thereby produced from strip-shaped rubber mixtures and from textile or metallic threads by application by means of special devices. The tire is heated together with the stable core and therefore without bellows, so no residual elevation occurs either during the vulcanization. These methods are technically very complex and economical only to a limited extent.

In the production of radial tires for trucks, it is known to apply the belt to a building drum already contoured according to the desired contour of the belt package in a conventional manner. However, with this building method the belt plies can be spliced only manually, since the splice of the overlapping end sections of each belt ply cannot be supported over the entire width of the building drum.

SUMMARY OF THE INVENTION

The invention provides for a method and a device of the type mentioned at the outset wherein a contoured belt can already be produced during the building of the tire, whereby the method should run automatically and, in particular, renders possible the automatic splicing of the belt plies.

According to one aspect of the invention a further building drum is shaped on the outside in a manner coordinated with or similar to the provided cross-sectional contour of the belt package in the finished tire. Through the expansion of the further building drum the carcass tube is joined to the belt package such that the belt package is contoured or shaped by the building drum and/or a device that can be brought into contact with the belt package from the outside.

According to another aspect of the invention the further building drum is shaped on the outside in a manner coordinated with or similar to the contour of the belt package in the finished tire. With the building drum expanded the carcass tube can be joined to the belt package with deformation of the same.

The invention makes it possible in a simple manner to provide the belt with a largely distortion-free final shaping during the tire building. The steel belt package is therefore expanded essentially evenly during the molding of the green tire in the subsequent vulcanization of the tire. The method according to the invention, and the device according to the invention, can be easily incorporated into a conventional building method or into conventional building devices.

In a preferred embodiment of the invention the belt package is contoured or shaped at least on the shoulder side via the device acting on the belt package from the outside. The initially cylindrical belt package can thus be contoured according to the outer contour of the further building drum in a particularly rational manner.

This device is preferably utilizes a rubber collar or the like, and can, in particular, be inflatable. The device is capable of encasing the belt package, and the inside of the collar in the inflated condition assumes a contour corresponding to the desired cross-sectional contour of the belt package. With a device of this type, the belt package can be contoured in a simple and uncomplicated manner. It is advantageous when this device is arranged on the transfer device.

During the expansion of the building drum, the core clamping devices are moved to the building drum laterally. The movement of the core clamping devices is thereby synchronized with the expansion movement of the building drum. It can thus be ensured at the same time that the carcass ply is placed under tension in a controlled manner during the expansion of the building drum.

A particular advantage of the method according to the invention is that the winding bandage can be applied to an already contoured belt. It is therefore also possible to apply the winding bandage as it were "close to the final contour" and to thus ensure the desired bandage tension in a simple manner. As with the conventional building method, the winding bandage can thereby be wound in a spiral manner from one or more material strips provided with strength supports and utilizing a winding head or several winding heads.

The devices used in conventional tire building can thereby also be used with the invention, with which the winding head or the winding heads is or are moved parallel to the axis of the rotating building drum for the spiral winding of the material strip or material strips.

A better winding quality is achieved by moving the winding head or the winding heads in the tire transverse direction following the contour of the belt package for the spiral winding of the material strip, whereby it is of additional advantage if the winding head or the winding heads are aligned perpendicular to the surface of contoured belt package. This permits the application of the winding bandage with constant tension over the material width and thus a particularly high-grade and high-quality production of the winding bandage.

In this connection it is of particular advantage if the further building drum is shaped on the outside such that the residual elevation is larger in the shoulder areas than in the zenith area during the molding of the fully built green tire in a vulcanizing mold. The winding bandage can thus be applied to the green tire with a constant tension. The different residual elevation produces the desired greater tension of the winding bandage in the shoulder areas.

The invention also provides for a method for building a radial tire comprising building a belt package on a build-up drum having a cylindrical outside circumference, building a carcass tube having an airtight inner layer, at least one carcass ply and two bead cores with core profiles, transferring the carcass tube to a building drum arranged between axially movable core clamping devices each comprising an inflatable bellows, transferring, with a transferring device, the belt package to the building drum and positioning the belt package over the carcass tube, and expanding the building drum to cause the carcass tube to be joined to the belt package, wherein the belt package is contoured or shaped by at least one of the building drum and a device acting on the belt package from outside.

The building drum may have an outside shape which corresponds to or is similar to a cross-sectional contour of the belt package of a finished tire. The belt package may comprise one of at least two belt plies and at least two automatically spliced belt plies. The belt package may be contoured or shaped at least on a shoulder side via the device acting on the belt package from the outside. The device acting on the belt package from the outside may comprise one of a rubber collar, an inflatable device encasing the belt package, a device which, in an inflated condition, assumes a contour corresponding to a desired cross-sectional contour of the belt package. The device acting on the belt package from the outside may be arranged on the transfer device. The method may further comprise during the expansion of the building drum, moving the core clamping devices laterally. The method may further comprise placing the carcass ply under tension during the expanding. The method may further comprise winding one or more material strips provided with strength supports on the belt package in a spiral manner utilizing one or more winding heads. The method may further comprises moving the one or more winding heads parallel to an axis of the building drum. The method may further comprise moving the one or more winding heads in a manner which follows a contour of the belt package. The method may further comprise one of adjusting the one or more winding heads perpendicular to a surface of the belt package and aligning the one or more winding heads perpendicular to a surface of the belt package.

The invention also provides for a device for building a radial tire comprising a first drum device for building a belt package, a transfer device for transferring the belt package from the first drum device to a second drum device having arranged thereon a carcass tube from at least one airtight inner layer, a carcass play and two bead cores with core profiles, and the second drum device being arranged between core clamping devices and being structured and arranged to join the carcass tube and the belt package during expansion of the second drum device, wherein the belt package is contoured or shaped by deformation via the second drum device.

The second drum device may have an outside shape which corresponds to or is similar to a cross-sectional contour of the belt package of a finished tire. The second drum device may have an outside shape whereby a residual elevation in shoulder areas is the same as or greater than in a zenith area of a finished green tire. The device may further comprise a device for shaping an outside of the belt package. The device for shaping may comprise an inflatable rubber collar that encases the belt package and that is arranged on the transfer device, whereby, in an inflated condition, said collar assumes an interior contour corresponding to a desired cross-sectional contour of the belt package. The transfer device may be adapted to include gripper devices for holding the belt package. The device may further comprise at least one winding head for applying a winding bandage on the belt package. The at least one winding head may be moveable perpendicular to an axis of the building drum. The at least one winding head may be moveable parallel to an axis of the building drum. The at least one winding head may be moveable parallel to an outside contour of the belt package.

The invention also provides for a device for building a radial tire comprising an expandable first drum device for building a belt package, an expandable second drum device for supporting a carcass tube comprising at least one airtight inner layer, a carcass play and two bead cores with core profiles, the second drum device being arranged between core clamping devices and being structured and arranged to join the carcass tube and the belt package during expansion of the second drum device, and a movable transfer device for transferring the belt package from the first drum device to a second drum device parallel to an axis of the first and second drum devices.

The invention also provides for a method for building a radial tire on the device described above, wherein the method comprises building a belt package, building a carcass tube, transferring the carcass tube to the second drum device, positioning the belt package over the carcass tube, and expanding the second drum device to cause the carcass tube to be joined to the belt package, wherein the belt package is contoured or shaped by at least one of the second drum device and a device acting on the belt package from outside.

The invention also provides for a method for building a radial tire comprising positioning a carcass tube on a drum device, positioning a belt package over the carcass tube, and expanding the carcass tube to be joined the carcass tube to the belt package and to contour the belt package.

The belt package may be contoured by at least one of a profile of the drum device and a device acting on the belt package from the outside.

BRIEF DESCRIPTION OF THE DRAWINGS

Further features, advantages and details of the invention are described in more detail based on the drawing, which shows diagrammatic exemplary embodiments of the invention wherein:

FIGS. 2a through 2e show process steps in the building of a radial tire; and

FIGS. 3a through 3c show alternative movements of a winding head applying a winding bandage during the building of a tire.

DETAILED DESCRIPTION OF THE INVENTION

Figure 1:
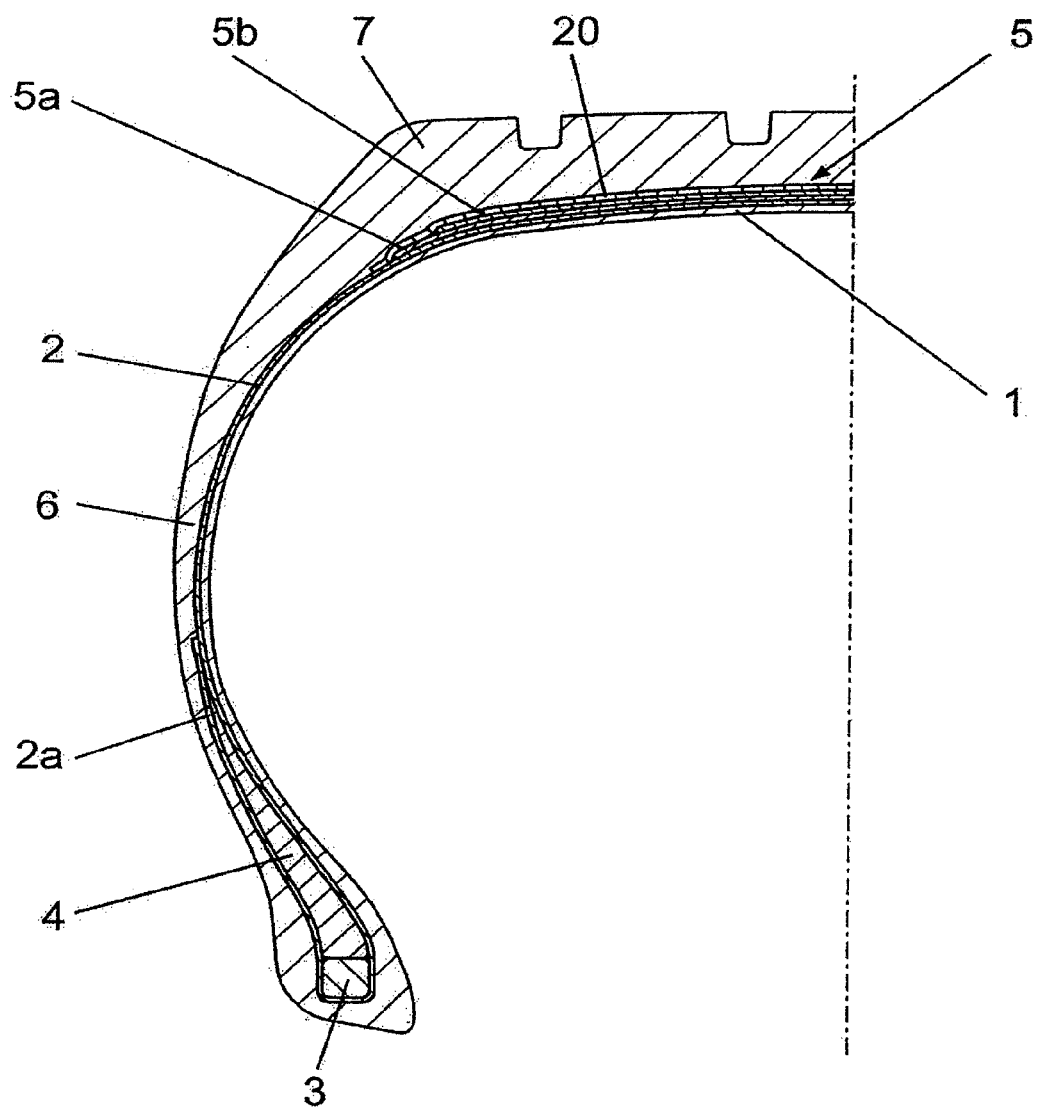
FIG. 1 shows a partial cross section through a radial automobile tire.

FIG. 1 shows a partial cross section through a radial tire for automobiles and shows only the main components of the tire, which include an airtight inner liner 1, a carcass ply 2, bead areas with bead cores 3 and core profiles 4, a belt package 5, which by way of example has two belt plies 5a, 5b, as well as sidewalls 6 and a profiled tread rubber 7. In the embodiment shown the belt package 5 is covered with a bandage 20 that is a so-called winding bandage produced in a known manner by winding a material strip in a spiral manner. The carcass ply 2 of an automobile tire generally has, in particular, textile or metallic strength supports embedded in a rubber mixture, which run from bead area to bead area. The carcass ply 2 is guided from inside to outside around the bead cores 3 so that its free end sections form the so-called turn-ups 2a and can also be embodied in a two-ply manner. The bead cores 3 can comprise one or more steel cable(s). The core profiles 4 resting thereon are profiles of a generally relatively hard rubber mixture. In tire production, or the building of the tire from its components, the bead cores 3 are prefabricated as a unit together with the as yet unvulcanized core profiles 4. This unit can be provided with a single-ply or multi-ply outer covering of a rubberized fabric, so-called bead protection strips.

A building process occurring on a contoured building drum 10 is respectively shown in the left half of FIGS. 2a through 2e. The right half of these figures respectively shows a cylindrical belt drum 11 and the building process optionally occurring here. The dot-dashed line "a" illustrates the axis of the building drum 10 and the axis of the belt drum 11, i.e., the second halves are not shown. That is, the second halves of the building drum 10 and the belt drum 11 are located below line "a" and as a mirror image to line "a".

In a building method according to the invention, a carcass tube 12 is first built in a conventional manner (not shown), and using a device embodied conventionally, preferably a cylindrical building drum, and is subsequently transported by a transfer device (not shown) to the building drum 10 and is there clamped to the core. The carcass tube 12 comprises at least the inner layer 1, the carcass ply 2 as well as the bead cores 3 with core profiles 4. As shown, the sidewalls 6 can already have been positioned as well.

The building drum 10 is a segmented drum, and therefore has over its circumference a number of identical segments, the outsides of which form the outside of the drum 10 and which can be moved in the radial direction for the uniform enlargement and reduction of the outside diameter. The segments can fundamentally be embodied in a manner known per se, with the difference from known embodiments being that the outsides of the segments are shaped such that in the expanded condition the cross-sectional contour of the segments largely or approximately correspond to the cross-sectional contour of the belt package 5 in the finished tire. As FIG. 1 shows, this cross-sectional contour is a round contour, such that the normal spacing of the outside of the segments from the axis "a" is largest in the zenith or the zenith area and smallest in the lateral areas. Generally, this spacing becomes smaller starting from the zenith towards the sides, whereby the contour can be designed per se in different ways. However, this design is not the subject matter of the invention. The segments of the building drum 10 can furthermore be embodied such that they mesh with finger-like extensions, or the like, at least in the non-expanded condition. Furthermore, the building drum 10 can be wrapped over its outside circumference with an elastically resilient collar or with a compressed air connection. A core clamping device or bellows support 14 is respectively positioned at each of the sides of the building drum 10 and can be moved in the direction of the axis "a" in a manner that is coordinated with the expansion and retraction movements of the building drum 10. A bellows 15 is arranged on the outside of each core clamping device 14. The bellows 15 turn up the sections of the carcass tube 12 located at the side of the set bead cores 3 utilizing inflation, thus producing the carcass turn-ups. This turn-up building stage, however, is not the subject matter of the invention.

The belt drum 11 is also embodied in a segmented manner, in particular, in a conventional manner. The outsides of the segments form an overall cylindrical drum exterior.

Figure 2A:
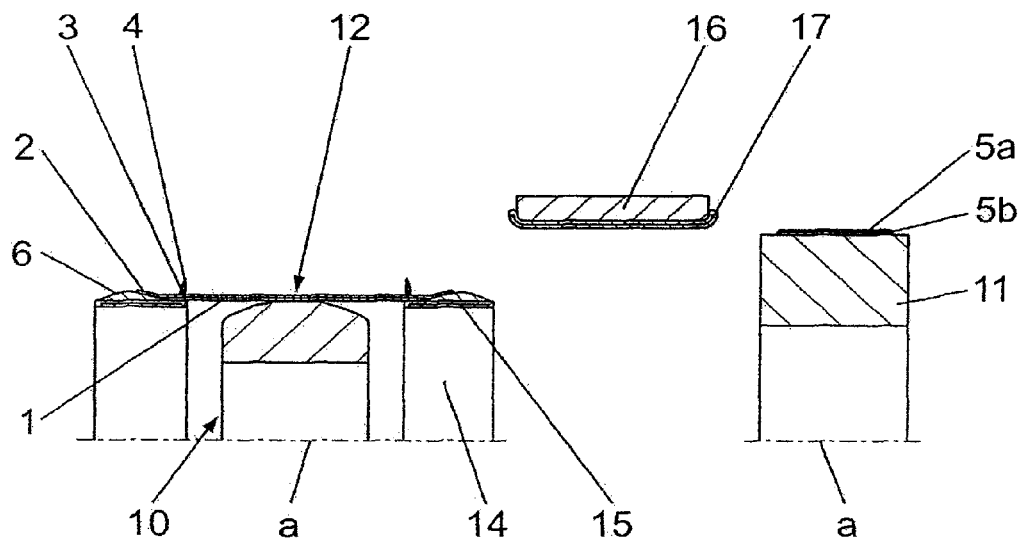

Relevant stages in the building of the tire will now be described based on FIGS. 2a through 2c. According to FIG. 2a, the carcass tube 12 is positioned and clamped on the building drum 10, and each core clamping device 14 is in a starting position and therefore spaced from the building drum 10. The belt drum 11 is expanded to a larger outside diameter in FIG. 2a, whereby the belt plies 5a, 5b have already been placed on the belt drum 11 and have preferably been automatically spliced. A transfer device 16 is located in a standby position in FIG. 2a. The transfer device 16 includes an inflatable rubber collar 17 (in one or more parts) on the inside circumference. The inside 17a of the collar assumes the desired outer contour of the belt in the inflated condition.

Gripper elements (not shown) for holding the belt package 5 built on the belt drum 11 are provided on the collar 17.

Figure 2B:
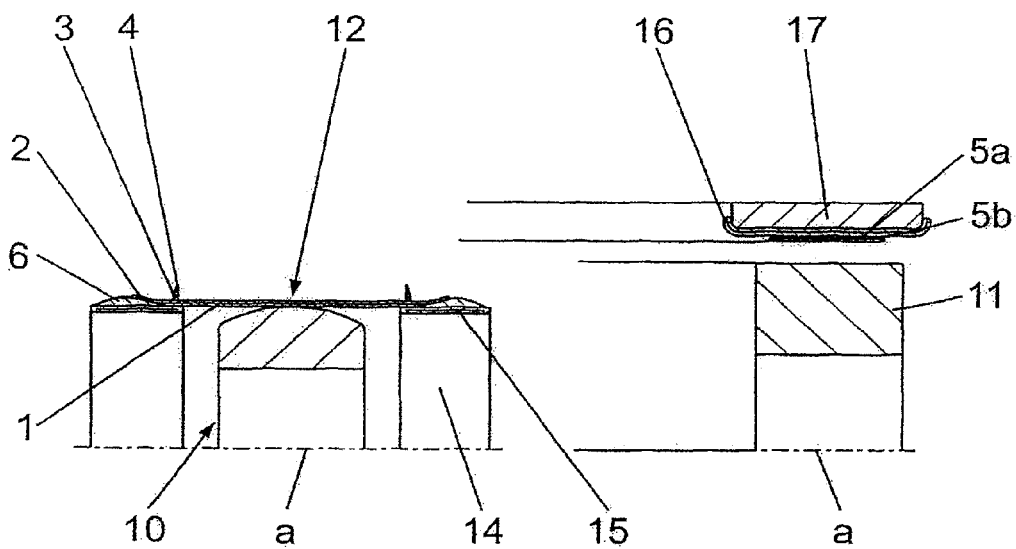
Figure 2C:
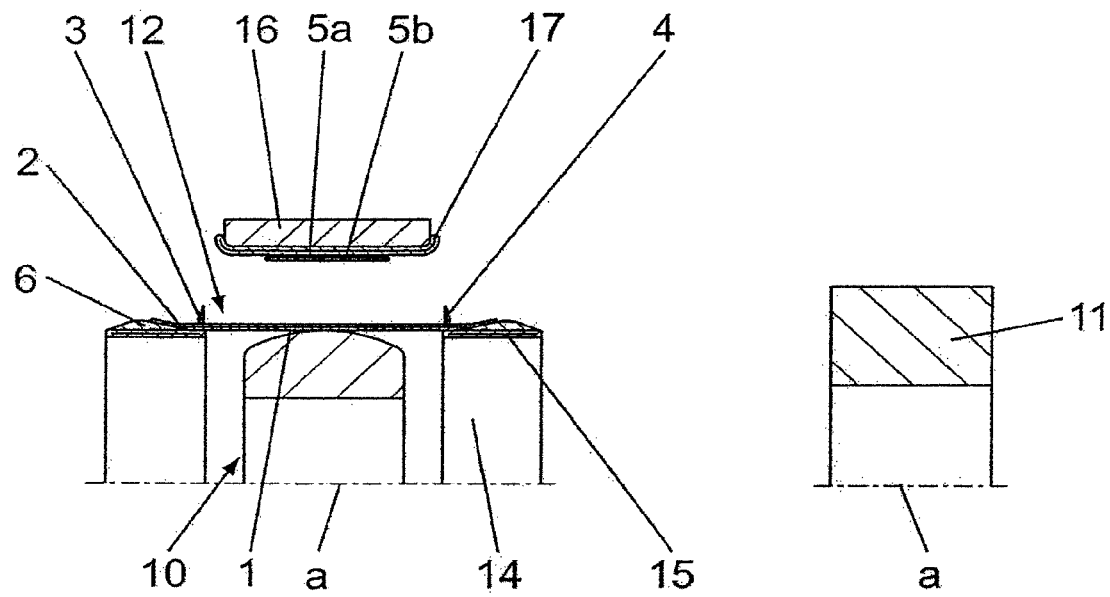
Figure 2D:
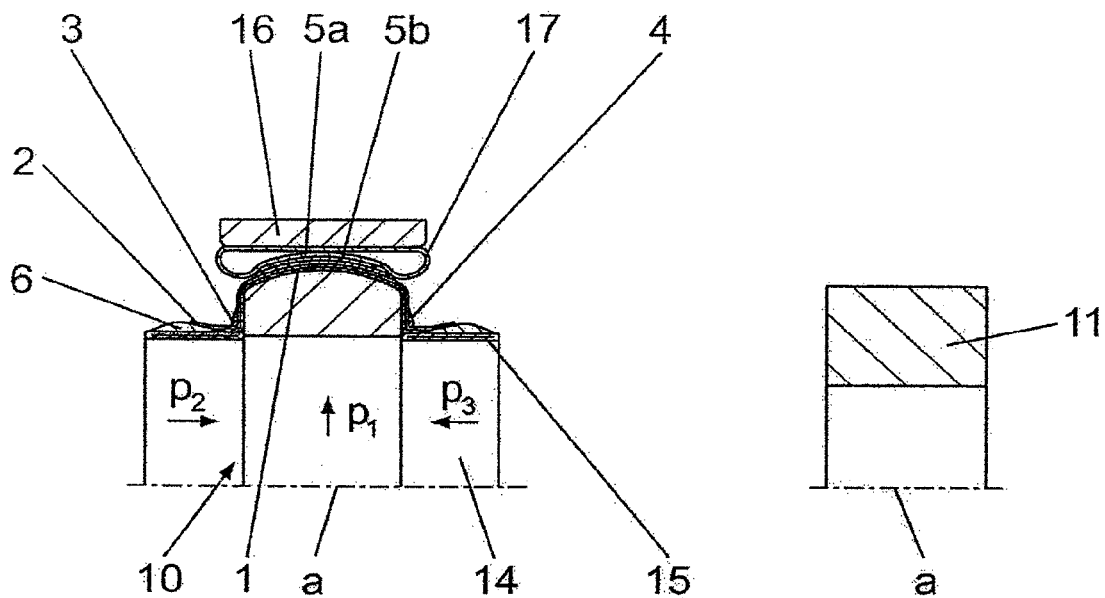

FIG. 2b shows the next building step. The transfer device 16 is moved over the belt drum 11 from the position shown in FIG. 2a, to pick up the belt package 5 from an expanded belt drum 11. Thereafter, the belt drum 11 retracts in order to be able to remove the transfer device 16 together with the belt package 5 from the belt drum 11. FIG. 2c shows a next stage. The transfer device 16 is positioned over the carcass tube 12 such that the belt package 5 is located centrally over the contoured building drum 10. The building drum 10 is expanded and simultaneously both core clamping devices or bellows supports 14 are moved in the direction of the building drum 10 in order to reposition the bead cores 3. The movement of the bellows supports 14 is synchronized accordingly with the expansion movement of the building drum 10. This applies a certain tension to the carcass ply in a targeted manner. In addition it can be provided to apply tension to the carcass tube 12 from inside via the interior of the building drum 10 by compressed air or the like. FIG. 2d shows the process after expansion, the arrows $p_1$ through $p_3$ illustrate the movements carried out by the bellows supports 14 and the segments of the building drum 10. The collar 17 is inflatable, and in FIG. 2d is shown in an already inflated position. The belt package 5 is shaped in this manner according to the contour of the outside of the building drum 10. Subsequently, the air is released from the collar 17 and the transfer device 16 is removed. FIG. 2e shows this stage of the tire construction.

With the embodiment shown in FIGS. 2a through 2e, the shaping of the contour of the belt package 5 on the expanded building drum 10 takes place utilizing the inflated collar 17. The diameter of the expanded building drum 10 in the zenith therefore corresponds to the inside diameter of the belt package 5. In another embodiment (not shown separately), the collar can be omitted, in that the building drum 10 itself carries out the shaping of the belt package 5. To this end the gripper elements (not shown) of the transfer device 16 can be moved radially or alternatively can be elastically deformed accordingly. The diameter of the expanded building drum 10 in the shoulder areas thereof corresponds to the inside diameter of the as yet unshaped belt package 5. The belt package 5 is therefore stretched over the entire belt width through the expansion of the building drum 10 and in this manner contoured in the desired manner.

In another embodiment (not shown) of the invention the diameter of the expanded building drum 10 is larger in the zenith and smaller in the shoulder areas than the inside diameter of the as yet unshaped belt package 5. In this embodiment, the belt package 5 is stretched in the zenith by the expansion movement of the building drum 10, in the shoulder areas the belt package 5 is compressed, and in this manner is contoured by the inflated collar 17 of the transfer device 16.

Using diagrammatic representations, FIGS. 3a through 3c show possibilities for placing a winding bandage on the already contoured belt package 5. Only the contoured outer area of the building drum 10 is thereby respectively shown in section with the associated components of the tire. While the building drum 10 is rotating, a winding bandage is applied by continuous winding of one or more strip(s) 19 in a spiral manner over the outer circumference of the belt package 5 in order to prevent an undesirable circumferential growth of the tire at high speeds. The strip 19 is composed of textile strength supports capable of thermal contraction, embedded in a rubber mixture and running in the longitudinal direction of the strip 19. The strength supports can be, e.g., nylon threads, whereby several threads per centimeter bandage width are used, in particular 7 to 12 threads per centimeter. The bandage strip 19 itself generally has a width of 10 to 15 mm and is fed automatically via a suitable device. This device is not the subject matter of the invention and is not shown. What is shown is respectively only a winding head 18, 18', 18", thus that part of the device that places the bandage strip 19 on the belt package 5. If the bandage is to be produced with several strips 19, a corresponding number of winding heads can be provided.

It should furthermore be noted that the individual windings of the bandage strip 19 can be applied joint to joint or also overlapping, and a winding of several plies of bandage strips 19 is possible to be provided section by section or over the entire width of the belt package. The type of winding or the winding pattern and the number of any plies are not the subject of the invention.

FIGS. 3a through 3c show different possibilities for carrying out the movement of the winding head 18, 18', 18" or the winding heads (if several are provided), with two windings of the strip 19 being illustrated. According to FIG. 3a, a movement of the winding head 18 parallel to the drum axis "a" is provided. The winding of the bandage therefore occurs analogously to the winding on a cylindrical belt drum, similar to the conventional building method, and therefore has the advantage that equipment already available can be used.

FIG. 3b shows a variant in which a movement of the winding head 18' is performed parallel to the contour of the drum surface or of the applied belt package 5. The orientation of the winding head 18' is perpendicular to the drum longitudinal axis "a". FIG. 3c shows an embodiment in which the winding head 18" follows the drum surface or the contour of the applied belt package. A variable position of the winding head 18" preferably to the drum surface or the surface of the belt package 5 is also possible.

The variants shown in FIG. 3b and FIG. 3c have the advantage of providing a better winding quality through the constant spacing of the winding head 18', 18" from the drum surface or the surface of the belt package 5. In the variant shown in FIG. 3c, it is additionally advantageous that a constant tension within the bandage strip renders possible a particularly high-quality application of the winding bandage.

After the application of the belt package 5 and the winding bandage, the building of the tire is finished and it is heated in a conventional manner in a vulcanizing mold.

With all the variants, the winding tension can be varied by suitable and known methods. It is usually desired for the tension of the bandage to be higher in the shoulder areas than in the central area. With one possible embodiment of the invention, the building drum 10 can be contoured such that the belt package 5 and thus the bandage applied thereto during the molding of the finished green tire in the vulcanizing mold have a residual elevation that is somewhat larger in the shoulder areas than in the central area of the belt package. The tension of the bandage in the shoulder areas is thus increased via the residual elevation.

The invention claimed is:

1. A method for building a radial tire comprising:
   building a belt package on a build-up drum having a cylindrical outside circumference;
   building a carcass tube having an airtight inner layer, at least one carcass ply and two bead cores with core profiles;
   transferring the carcass tube to a segmented building drum arranged between axially movable core clamping devices each comprising an inflatable bellows, the outsides of the building drum segments forming the outside of the building drum;
   transferring, with a transferring device having an inflatable collar, the belt package to the building drum and positioning the belt package over the carcass tube;
   expanding the building drum;
   joining the carcass tube to the belt package using the building drum and the transferring device such that a contour of the belt package is shaped in a manner in which a zenith of the belt package is stretched by expansion movement of the building drum against the inflatable collar and shoulder areas of the belt package are compressed by expansion of the inflatable collar of the transferring device, said inflatable collar extending from one side of the belt package to another side of the belt package and the diameter of said building drum, when expanded, being larger in the zenith and smaller in the shoulder areas than an inside diameter of the belt package prior to the belt package being shaped; and
   winding plies of bandage strips over an entire width of the belt package while the belt package is arranged on the building drum,
   wherein the belt package is contoured or shaped on the building drum during the joining and before the winding.

2. The method of claim 1, wherein the building drum has an outside shape which corresponds to or is similar to a cross-sectional contour of the belt package of a finished tire.

3. The method of claim 1, wherein the belt package comprises one of:
   at least two belt plies; and
   at least two automatically spliced belt plies.

4. The method of claim 1, further comprising, during the expansion of the building drum, moving the core clamping devices laterally.

5. The method of claim 1, further comprising placing the carcass ply under tension during the expanding.

6. The method of claim 1, wherein the winding plies of bandage strips occurs in a spiral manner utilizing one or more winding heads.

7. The method of claim 6, further comprising moving the one or more winding heads parallel to an axis of the building drum.

8. The method of claim 6, further comprising moving the one or more winding heads in a manner which follows a contour of the belt package.

9. The method of claim 6, further comprising one of:
adjusting the one or more winding heads perpendicular to a surface of the belt package; and
aligning the one or more winding heads perpendicular to a surface of the belt package.

10. A method for building a radial tire comprising:
building a belt package on a build-up drum having a cylindrical outside circumference;
building a carcass tube having an airtight inner layer, at least one carcass ply and two bead cores with core profiles;
transferring the carcass tube to a segmented building drum arranged between axially movable core clamping devices each comprising an inflatable bellows, the outsides of the building drum segments forming the outside of the building drum;
transferring, with a transferring device having an inflatable collar, the belt package to the building drum;
stretching and shaping the belt package on the carcass tube using the inflatable collar and the building drum such that a zenith of the belt package is stretched by expansion movement of the building drum against the inflatable collar and shoulder areas of the belt package are compressed by expansion of the inflatable collar, said inflatable collar extending from one side of the belt package to another side of the belt package and the diameter of said building drum, when expanded, being larger in the zenith and smaller in the shoulder areas than an inside diameter of the belt package prior to the belt package being shaped;
after the stretching and shaping, moving the transferring device away from the building drum; and
after the moving, winding, with at least one winding head, plies of bandage strips over an entire width of the stretched and shaped belt package while the belt package is arranged on the building drum.

11. The method of claim 10, further comprising:
during the expansion of the building drum, moving the core clamping devices laterally; and
after the winding, heating the tire in a vulcanizing mold.

* * * * *